United States Patent
Moody et al.

(10) Patent No.: US 6,203,279 B1
(45) Date of Patent: Mar. 20, 2001

(54) ASSEMBLY FOR SUSPENDING AN OBJECT FROM A SURFACE

(75) Inventors: John Moody, Bunker Hill; David Lathrop, Edwardsville, both of IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/344,420

(22) Filed: Jun. 25, 1999

(51) Int. Cl.[7] ..................................................... F04D 29/64
(52) U.S. Cl. .......................... 416/244 R; 416/5; 248/343
(58) Field of Search ..................................... 416/5, 244 R, 416/246; 248/342, 343, 344, 181.1, 181.2, 288.31, 481; 403/128, 131, 141, 142, 143

(56) References Cited

U.S. PATENT DOCUMENTS

| | | | |
|---|---|---|---|
| 4,634,345 | * 1/1987 | Stanek et al. | 416/244 R |
| 4,878,806 | * 11/1989 | Markwardt | 416/5 |
| 5,090,654 | * 2/1992 | Ridings et al. | 248/343 |
| 5,151,011 | * 9/1992 | Rezek | 416/5 |
| 5,613,832 | * 3/1997 | Su | 416/244 R |
| 5,851,107 | * 12/1998 | Wang | 416/244 R |
| 5,947,436 | * 9/1999 | Bucher et al. | 248/343 |
| 5,984,640 | * 11/1999 | Wang | 416/244 R |

FOREIGN PATENT DOCUMENTS

1294965 * 11/1972 (GB) ..................................... 403/142

* cited by examiner

Primary Examiner—Christopher Verdier
(74) Attorney, Agent, or Firm—Howrey Simon Arnold & White, LLP

(57) ABSTRACT

An assembly for suspending an object from a surface is presented. The assembly includes a downrod with an upper ball member, and a hanger bracket that is mounted on the surface which has a lower socket that engages the ball member. The ball member and socket form a ball and socket joint which allows an object to be suspended downward from a sloped ceiling. The ball member is mounted in the socket by passing the downrod through a gap in the socket. A plate is then attached to the socket on either side of the gap which is shaped so as not to interfere with the movement of the ball member in the socket. The plate prevents the socket from spreading through use over time which could result in the socket becoming to large to contain the ball member. This assembly is particularly suited for hanging objects such as ceiling fans or light fixtures from surfaces such as ceilings, including sloped or cathedral ceilings.

14 Claims, 2 Drawing Sheets understood by reference to one or more of these drawings in combination with the detailed description of specific embodiments presented herein. The figures depict one

ASSEMBLY FOR SUSPENDING AN OBJECT FROM A SURFACE

BACKGROUND OF THE INVENTION

1. Field of the Invention

The present invention relates generally to an assembly for suspending an object from a surface. More particularly, it concerns a method for suspending an object, such as a ceiling fan or a light fixture from a sloped ceiling.

2. Description of Related Art

Devices for suspending objects, such as ceiling fans and light fixtures, from surfaces, such as ceilings, have typically involved a hanger bracket attached to the surface which engages the object to be hung. The difficulties of mounting such objects from sloped ceilings have been overcome through the use of hanger brackets which have a socket that engages a ball member on the top of a downrod to form a ball and socket joint. The lower end of the downrod, in turn, engages the object to be hung. This mounting scheme allows the downrod to pivot in the hanger bracket so that the object may hang downward despite the angle of the ceiling.

A common configuration for such devices is to have a gap in the socket of an appropriate width such that the downrod can pass through the gap when mounting the ball member in the socket. This configuration is frequently used as it allows for convenient mounting of objects for installation purposes and unmounting of objects for purposes such as servicing the objects. But with this configuration, the gap in the socket could potentially spread over time depending upon the elasticity of the material from which it is made and the weight of the object which is hung. The present invention therefore addresses these shortcomings in the prior art.

SUMMARY OF THE INVENTION

The present invention is an improvement on the above common configuration. In the present invention, a plate is provided that can be attached to either side of the gap after mounting the ball member which does not interfere with the pivoting motion of the ball member in the socket. This present invention provides a distinct advantage over prior configurations as the plate enhances the stability of the socket and prevents it from spreading and/or losing its integrity over time.

In one aspect of the invention, an assembly is provided for suspending an object from a surface, such as a ceiling. The assembly includes a downrod rod with a top ball member and a lower end that engages the object. The assembly further includes a hanger bracket that is mounted to the surface, the bottom end of which defines a socket joint which is adapted to receive the ball member. The socket has a gap through which the downrod can pass when mounting the ball member in the socket. A plate is then provided which is attached to the socket on both sides of the gap and is shaped so that, when attached, it does not interfere with the pivoting movement of the ball member in the socket. In one embodiment, the plate is flat and semi-circular and is shaped to cover the gap when attached to the socket. The assembly can be used to suspend any object from any surface, but is particularly suited for suspending ceiling fans and light figures from ceilings.

In another aspect of the invention, a ceiling fan is provided which includes the above described apparatus for suspension from the ceiling.

In a further aspect of the invention, a method for suspending an object from a surface is provided. This method includes the steps of mounting a hanger bracket with a socket joint to a surface, mounting a downrod with a ball member in the socket joint by passing the downrod through a gap in the socket joint, and attaching a plate to the socket on both sides of the gap which is shaped so that it does not interfere with the movement of the ball member in the socket. In one embodiment, the plate is flat and semi-circular and is shaped to cover the gap when attached to the socket. This method can be used to suspend any object from any surface, but is particularly suited for suspending ceiling fans and light fixtures from ceilings.

BRIEF DESCRIPTION OF THE DRAWINGS

The following drawings form part of the present specification and are included to further demonstrate certain aspects of the present invention. The invention may be better embodiment of the present invention which is a ceiling fan suspended from a sloped ceiling. However, it can be appreciated by one of skill in the art that the disclosed invention can be used to suspend any object (including lights, light fixtures, chandeliers, art and plants) from any surface (including non-sloped ceilings, cathedral ceilings, support beams, or other support structures).

Figure 1:
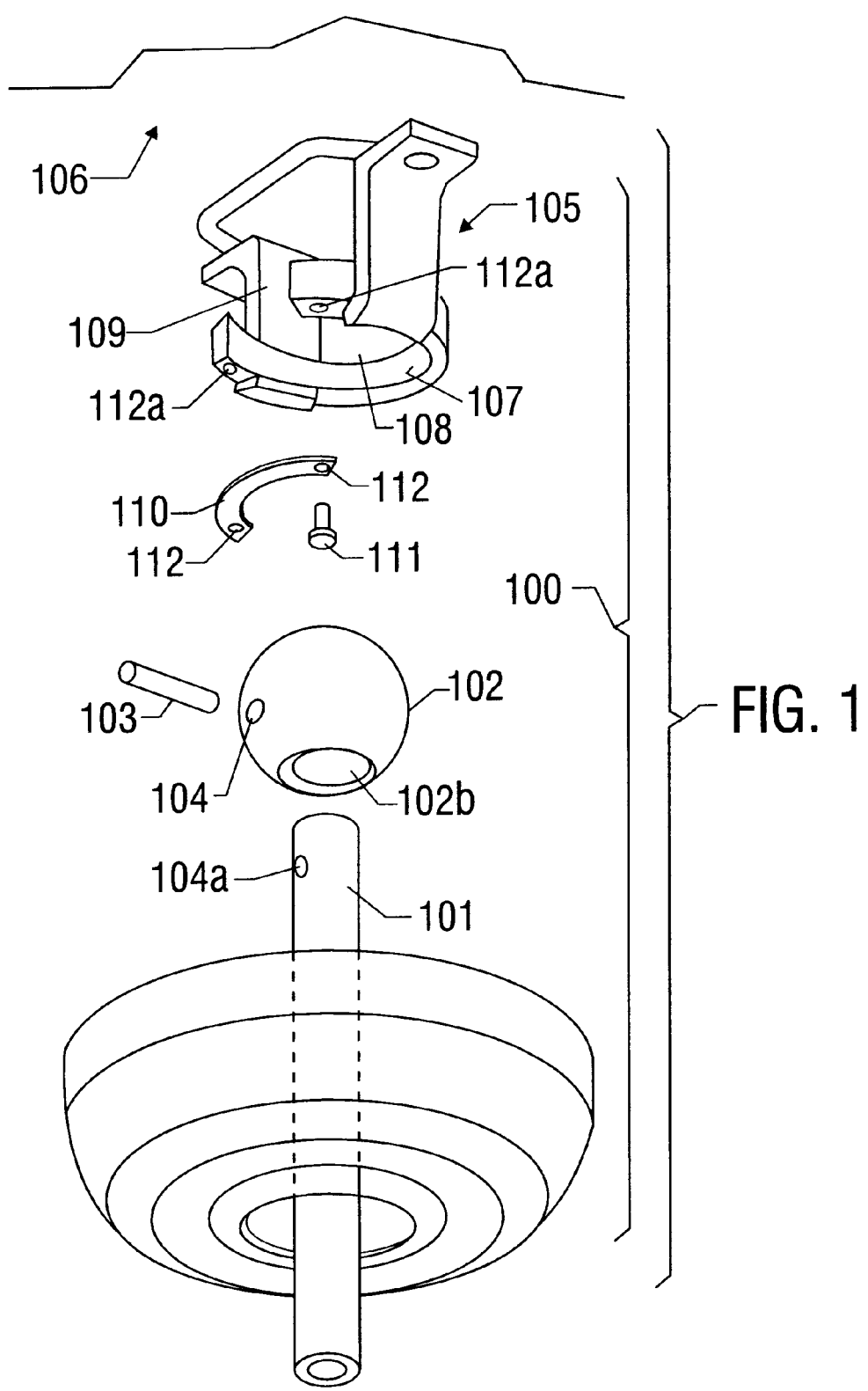
FIG. 1 is an exploded view of a ceiling fan in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
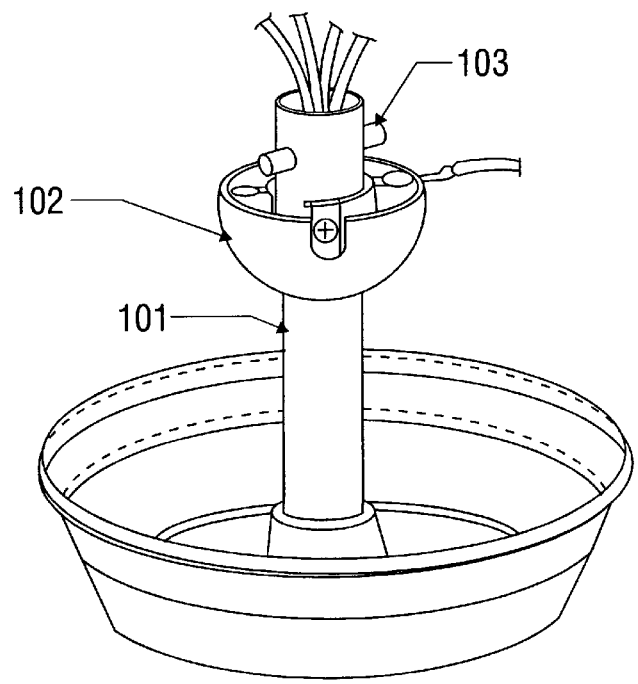
FIG. 3 depicts a close up view of an embodiment of how the downrod is connected with the ball member in accordance with the present invention.

FIG. 1 schematically illustrates one particular embodiment of the invention which is an assembly 100 for suspending an object from a surface. A downrod 101 having a width is provided which also has a ball member 102 on its upper end and a lower end for engaging the object to be suspended. The object can be any object, including a ceiling fan or a light fixture. As shown in FIG. 1, the ball member 102 is connected to the downrod 101 by means of a hanger pin 103 which passes through holes 104a in the upper end of the downrod 101 which are positioned to receive the hanger pin 103. In one embodiment, the hanger pin 103 passes through holes 104 on the ball member 102 and holes 104a on the upper end of the downrod 101. Yet in another embodiment, the pin 103 passes through holes 104a once the downrod 101 has been inserted through the bottom cavity 102b of the ball 102, as shown in FIG. 3. As a result, the pin 103 is cradled inside the ball 102. The downrod 101 may be further secured to the ball member 102 with setscrews or fasteners while the pin 103 is cradled inside the ball member 102. However, the ball member 102 can be connected in any manner to the downrod 101, including through the use of screws, nuts and bolts, or adhesives. Moreover, the downrod 101 can be molded or shaped to include an integral ball member 102 component. The term "connected to" in the context of connecting the ball member 102 to the downrod 101 is intended to encompass any of the above means of connecting the ball member to the downrod, including the integrally molded configuration.

A hanger bracket 105 is also provided having an upper end which is mounted to the surface 106. The surface 106 can be any surface, including a flat ceiling, a sloped or cathedral ceiling, or a support beam. The hanger bracket 105 also has a bottom end which defines a socket 107 having an opening 108 therethrough which is wider than the width of the downrod 101 and narrower than the diameter of the ball member 102. The socket 107 is shaped to receive the ball member 102 so that they form a ball and socket joint. The ball member 102 is received in the socket 107 such that the downrod 101 extends through the opening 108. The socket 107 further defines a gap 109 in the socket 107. The gap 109 is wider than the width of the downrod 101 and narrower than the diameter of the ball member 102 and is positioned so that the downrod 101 can pass through the gap 109 when mounting the ball member 102 in the socket 106.

Finally, a plate 110 is removably attached to the socket 107 on both sides of the gap 109. The plate 110 is shaped so that, when attached to the socket 107, it does not interfere with the movement of the ball member 102 in the socket 107. The plate 110 can be attached to the socket 107 in any manner, including through the use of screws, nuts and bolts, or adhesives. It is preferred that the plate 110 be attached to the socket 107 using screws 111 which pass through screwholes 112 on the plate 110 and 112a on the socket 107 which are defined to receive said screws 111. The plate 110 can be any shape, so long as it does not interfere with the movement of the ball member 102 in the socket 107. It is preferred that the plate 110 be flat and either rectangular or semi-circular. It is most preferred that the plate 110 be flat and semi-circular with an internal radius approximately equal to that of the socket 107 and be sized to cover the gap 109 when attached to the socket 107 as shown. The downrod 101, ball member 102, hanger pin 103, hanger bracket 105, plate 110 and screws 111 can be made of any hard, durable material. It is preferred that they be made of either a hard durable plastic or a metal.

When the assembly 100 is completely assembled, it can be appreciated that the downrod 101 has a range of rotational movement facilitated by the ball and socket joint formed by the ball member 102 and the socket 107. This range of rotational movement allows the object to be suspended downward even when the assembly is mounted to sloped surfaces such as a sloped or cathedral ceiling. The ability of the assembly 100 to suspend an object downward from sloped or cathedral ceilings with higher pitch angles is determined, in part, by the range of rotational movement facilitated by the ball and socket joint. The range of rotational movement is determined by the size of the ball member 102, the diameter of the socket 107, and the diameter of the downrod 101. It can be appreciated that a larger ball member 102 and socket 107 diameter and a smaller downrod 101 diameter will facilitate a greater range or motion.

It can be further appreciated that the plate 110 gives added stability to the assembly 100. By attaching the plate 110 to the socket 107 on either side of the gap 108, the plate 110 prevents the socket 107 and gap 108 from spreading through use over time. Without the plate, there is a potential that the socket 107 and gap 108 could spread over time. Such spreading would be a function of the weight of the suspended object and the durability of the material used to make the hanger bracket 105. Without the plate 110, there is the potential that the socket 107 could spread to the extent that its internal radius is greater than that of the ball member 102 in which case the socket 107 would no longer be able to contain the ball member 102. The plate 110 aids in preventing such spreading from occurring.

Figure 2:
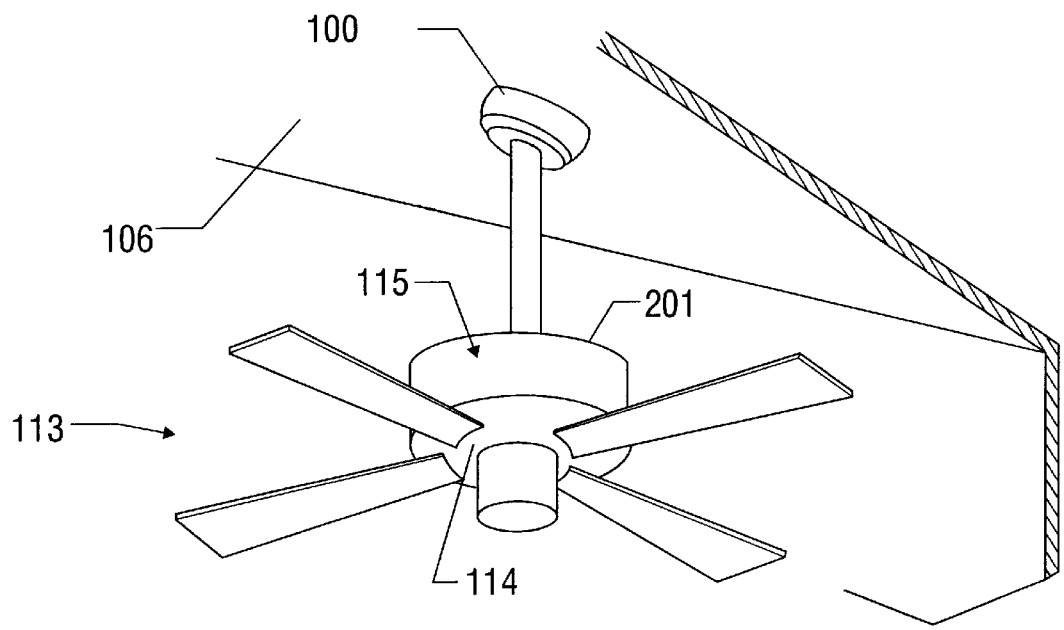
FIG. 2 is a front view of an assembly for suspending an object from a surface in accordance with the present invention.

FIG. 2 illustrates another embodiment of the invention. In FIG. 2, the assembly 100 is utilized to suspend a ceiling fan 113 from a surface 106 which is a sloped ceiling. The ceiling fan comprises the assembly 100, a rotating member 114, an upper stationary member 115, and a motor (not shown). The rotating member 114, upper stationary member 115, and motor can be of any type known in the art. The rotating member 114, in turn, is connected to fan blades through means known in the art. As shown in FIG. 2, the lower end of the downrod 201 engages the upper stationary member 115. Just like in FIG. 1, it can be appreciated that the assembly 100 allows the ceiling fan 113 to be hung downward from the sloped ceiling and that the plate 110 gives added stability to the assembly.

It is a further aspect of this invention to provide a method for suspending an object from a surface. The object could be any object, including a ceiling fan, light fixture, plant or piece of art. The surface can be any surface including a ceiling, a sloped or cathedral ceiling, a support beam or other support structure.

Using the embodiment shown in FIG. 1, the method consists of mounting an upper end of a hanger bracket 105 to the surface wherein the hanger bracket has a bottom end that defines a socket 107. A downrod 101 is then provided having an upper end and a lower end, and having a ball member 102 connected to the upper end. The term "connected" in this context includes a ball member 102 that is a separate element that is physically attached to the downrod 101 and a downrod 101 that is molded or shaped to include an integral ball member component.

The downrod 101 is then passed through a gap 109 in the socket 107 and into an opening 108 defined by the socket 107, wherein the gap 109 and the opening 108 each are wider than the width of the downrod 101 and narrower than the diameter of the ball member 102. The ball member 102 is then lowered into the socket 107 so that the downrod 101 extends through the opening 108.

A plate 110 is then removably attached to the socket 107 on both sides of the gap 109. The plate 110 is shaped so that it does not interfere with the movement of the ball member 102 in the socket. The plate 110 may be removably attached with screws which pass through screwholes on the plate 110 and on the socket 107 which are defined to receive said screws. The plate 110 can be any shape, so long as it does not interfere with the movement of the ball member 102 in the socket 107. It is preferred that the plate 110 be flat and either rectangular or semicircular. It is most preferred that the plate 110 be flat and semicircular with an internal radius approximately equal to that of the socket 107 and sized to cover the gap 109 when attached to the socket 107.

An object suspended in this manner is capable of hanging downward, even if the surface is sloped, because of the ball and socket joint formed by the ball member and the socket. Moreover, an object suspended in this manner has added stability imparted by the plate. The plate helps to prevent the socket and gap from spreading during use.

It will be appreciated by those of ordinary skill in the art having the benefit of this disclosure that the embodiment illustrated above is capable of numerous variations without departing from the scope and spirit of the invention. It is fully intended that the invention for which a patent is sought encompasses within its scope all such variations without being limited to the specific embodiment disclosed above. Accordingly, the exclusive rights sought to be patented are as described in the claims below.

What is claimed is:

1. An assembly for suspending an object from a surface comprising:
    a) a downrod having a width, an upper end, and a lower end for engaging the object;
    b) a ball member having a diameter wherein the ball member is connected to the upper end of the downrod;
    c) a hanger bracket having an upper end for being mounted to the surface and a bottom end defining a socket having an opening therethrough which is narrower than the diameter of the ball member, the openini defining a radius, wherein the bail is received in the socket such that the downrod extends through the opening;
    d) wherein the socket further defines a gap that is wider than the width of the downrod and narrower than the diameter of the ball member and that is positioned so that the downrod can pass through the gap when mounting the ball member in the socket;
    e) a flat plate defining a radius approximately equal to the radius of the socket opening so that, when attached to the socket, the plate does not interfere with the movement of the ball member in the socket; and
    f) first and second fasteners situated at opposite ends of the plate to attach the plate to the socket on both sides of the gap, thus preventing the gap from spreading.

2. The assembly of claim 1 wherein the first and second fastener comprise first and second screws which pass through screwholes on the plate and on the socket which are defined to receive said screws.

3. The assembly of claim 2 wherein the plate is sized to cover the gap when attached to the socket.

4. The assembly of claim 3 wherein the object is a ceiling fan.

5. The assembly of claim 1 wherein the upper end of the downrod defines holes; and wherein the ball member is fixedly attached to the downrod by means of a hanger pin which passes through the holes in the upper end of the downrod, the holes being positioned to receive the hanger pin.

6. A ceiling fan comprising an assembly for mounting to a ceiling, a motor, a rotating member, and an upper stationary member, wherein said assembly comprises:
    a) a downrod having a width, an upper end, and a lower end for engaging the upper stationary member;
    b) a ball member having a diameter wherein the ball member is connected to the upper end of the downrod;
    c) a hanger bracket having an upper end for being mounted to the ceiling and a bottom end defining a socket having an opening therethrough which is narrower than the diameter of the ball member, the opening defining a radius, wherein the ball member is received in the socket such that the downrod extends through the of
    d) wherein the socket further defines a gap that is wider than the width of the downrod and narrower than the diameter of the ball member and that is positioned so that the downrod can pass through the gap when mounting the ball member in the socket;
    e) a flat plate defining a radius approximately equal to the radius of the socket opening so that, when attached to the socket, the plate does not interfere with the movement of the ball member in the socket; and
    f) first and second fasteners situated at opposite ends of the plate to attach the plate to the socket on both sides of the zap, thus preventing the gap from spreading.

7. The ceiling fan of claim 6 wherein the first and second fasteners comprise first and second screws which pass through screwholes on the plate and on the socket which are defined to receive said screws.

8. The ceiling fan of claim 7 wherein the plate is sized to cover the gap when attached to the socket.

9. The ceiling fan of claim 6 wherein the upper end of the downrod defines holes; and wherein the ball member is fixedly attached to the downrod by means of a hanger pin which passes through the holes in the upper end of the downrod, the holes being positioned to receive the hanger pin.

10. A method for suspending an object from a surface comprising the steps of:
    a) mounting an upper end of a hanger bracket to the surface, the hanger bracket having a bottom end that defines a socket;
    b) providing a downrod having an upper end and a lower end, and having a ball member connected to the upper end,
    c) passing the downrod through a gap in the socket and into a circular opening defined by the socket, the gap and the opening each being wider than the width of the downrod and narrower than the diameter of the ball member;
    d) lowering the ball member into the socket so that the downrod extends through the opening;
    e) situating opposite ends of a flat plate proximate to respective sides of the gap, wherein the plate defines a radius approximately equal to a radius defined by the circular opening defined by the socket;
    f) preventing the gap from spreading by affixing first and second fasteners to the opposite ends of the plate and the respective sides of the gap to attach the plate to the socket; and
    g) connecting the lower end of the downrod to the object.

11. The method of claim 10 wherein affixing the first and second fasteners includes passing first and second screws through corresponding screwholes extending through the plate and the socket which are defined to receive said screws.

12. The method of claim 11 wherein the plate is sized to cover the gap when attached to the socket.

13. The method of claim 10 wherein the upper end of the downrod defines holes; and wherein the ball member is fixedly attached to the downrod by means of a hanger pin which passes through the holes in the upper end of the downrod, the holes being positioned to receive the hanger pin.

14. An assembly for suspending an object from a surface comprising:

a) a downrod having a width, an upper end, and a lower end for engaging the object;
b) a ball member having a diameter wherein the ball member is connected to the upper end of the downrod;
c) a hanger bracket having an upper end for being mounted to the surface and a bottom end defining a socket having a circular opening therethrough which is narrower than the diameter of the ball member, the ball member being received in the socket such that the downrod extends through the opening;
d) wherein the socket further define a gap that is wider than the width of the downrod and narrower than the diameter of the ball member and that is positioned so that the downrod can pass through the gap when mounting the ball member in the socket; and
e) a plate removably attached to the socket on both sides of the gap wherein the plate is shaped so that, when attached to the socket it does not interfere with the movement of the ball member in the socket, the plate being attached to the socket with screws which pass through screwholes on the plate and on the socket which are defined to receive said screws.

* * * * *

UNITED STATES PATENT AND TRADEMARK OFFICE
CERTIFICATE OF CORRECTION

PATENT NO. : 6,203,279 B1
DATED : March 20, 2001
INVENTOR(S) : John Moody, et al.

Page 1 of 1

It is certified that error appears in the above-identified patent and that said Letters Patent is hereby corrected as shown below:

Column 5,
Line 32, delete "openini" and insert -- opening --
Line 33, delete "bail" and insert -- ball member --
Line 49, delete "fastener" and insert -- fasteners --

Column 6,
Line 7, delete "of" and insert -- opening --
Line 18, delete "zap" and insert -- gap --

Column 7,
Line 12, delete "define" and insert -- defines --

Column 8,
Line 5, after the word "a" insert -- flat --
Line 7, after the word "socket" insert -- , --

Signed and Sealed this

Twenty-seventh Day of November, 2001

Attest:

Nicholas P. Godici

NICHOLAS P. GODICI
*Attesting Officer*  *Acting Director of the United States Patent and Trademark Office*